United States Patent
Seo et al.

(10) Patent No.: US 9,599,203 B2
(45) Date of Patent: Mar. 21, 2017

(54) CONTINUOUSLY VARIABLE TRANSMISSION FOR VEHICLE

(71) Applicant: Hyundai Motor Company, Seoul (KR)

(72) Inventors: Taeseok Seo, Hwaseong-si (KR); Seongeun Yun, Bucheon-si (KR); Jinhaeng Lee, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 36 days.

(21) Appl. No.: 14/560,303

(22) Filed: Dec. 4, 2014

(65) Prior Publication Data

US 2016/0084362 A1 Mar. 24, 2016

(30) Foreign Application Priority Data

Sep. 23, 2014 (KR) .......................... 10-2014-0126790

(51) Int. Cl.
*F16H 37/08* (2006.01)
*F16H 37/02* (2006.01)

(52) U.S. Cl.
CPC ....... *F16H 37/0846* (2013.01); *F16H 37/022* (2013.01); *F16H 2037/088* (2013.01)

(58) Field of Classification Search
CPC ................. F16H 37/021; F16H 37/022; F16H 2200/2005; F16H 2200/2035; F16H 2200/0008; F16H 2037/026; F16H 2037/025; F16H 2037/048; F16H 2037/0846; F16H 9/26; F16H 9/18; F16H 37/08; F16H 37/06; F16H 37/02; B60K 6/22; B60K 17/02; B60K 17/04
See application file for complete search history.

(56) References Cited

U.S. PATENT DOCUMENTS 3,340,749 A * 9/1967 Schreiner ............ F16H 37/0846
  475/211
5,853,343 A * 12/1998 Eggert .................. F16H 37/022
  475/210
5,944,628 A 8/1999 Lee
(Continued)

FOREIGN PATENT DOCUMENTS

JP 9-317844 A 12/1997
JP 11-325207 A 11/1999
(Continued)

*Primary Examiner* — Derek D Knight
*Assistant Examiner* — Lori Wu
(74) *Attorney, Agent, or Firm* — Morgan, Lewis & Bockius LLP

(57) ABSTRACT

A continuously variable transmission for a vehicle may include an input shaft receiving torque of an engine, a first power delivery shaft disposed in parallel with and apart from the input shaft, a variable shift apparatus configured to change rotation speed of the input shaft and transmit the changed rotation speed to the first power delivery shaft, a second power delivery shaft selectively receiving torque of the first power delivery shaft, a third power delivery shaft disposed apart from the second power delivery shaft, a planetary gear set including first, second, and third rotation elements, and an idle gear set operably connecting the input shaft with the first rotation element of the planetary gear set in which the second rotation element is directly connected to the third power delivery shaft and the third rotation element is directly connected to the second power delivery shaft.

11 Claims, 2 Drawing Sheets

(56) References Cited

U.S. PATENT DOCUMENTS

| | | | |
|---|---|---|---|
| 7,246,672 B2* | 7/2007 | Shirai | B60K 6/365 |
| | | | 180/65.25 |
| 8,579,753 B2 | 11/2013 | Heitzenrater et al. | |
| 2015/0167802 A1* | 6/2015 | Yoshida | F16H 37/022 |
| | | | 475/211 |
| 2016/0047447 A1* | 2/2016 | Janson | F16H 37/022 |
| | | | 475/213 |
| 2016/0121896 A1* | 5/2016 | Matsuo | B60W 10/02 |
| | | | 701/53 |
| 2016/0131256 A1* | 5/2016 | Toyoda | F16H 37/022 |
| | | | 701/51 |

FOREIGN PATENT DOCUMENTS

| | | | | |
|---|---|---|---|---|
| JP | 2001-74113 A | | 3/2001 | |
| JP | 2013-72503 A | | 4/2013 | |
| JP | 2014-196772 A | | 10/2014 | |
| KR | 0154069 | * | 10/1998 | F16H 3/44 |
| KR | 10-2011-0097196 A | | 8/2011 | |

* cited by examiner

| | CL | Lever analysis |
|---|---|---|
| REV (reverse range) | ○ |  OD |
| N (neutral) | × |  Rn |
| D (drive range) | ○ |  UD |

CONTINUOUSLY VARIABLE TRANSMISSION FOR VEHICLE

CROSS-REFERENCE TO RELATED APPLICATION

The present application claims priority to Korean Patent Application No. 10-2014-0126790 filed Sep. 23, 2014, the entire contents of which is incorporated herein for all purposes by this reference.

BACKGROUND OF THE INVENTION

Field of the Invention

The present invention relates to a continuously variable transmission for a vehicle. More particularly, the present invention relates to a continuously variable transmission for a vehicle which improves fuel economy and power performance as a consequence of realizing continuously variable gear stage and enlarging a range of speed ratios.

Description of Related Art

Generally, a continuously variable transmission is configured to receive torque output from an engine through power delivery means of fluid type such as a torque converter or a fluid coupling, to change the torque according to a speed ratio which changes continuously and is achieved by a variable shift apparatus, and to transmit the changed torque to an output shaft.

The variable shift apparatus includes first and second variable pulleys disposed respectively on a driving shaft and a driven shaft, and a metal belt connecting the first and second variable pulleys. The variable shift apparatus is adapted to change the speed ratios continuously by controlling widths of the first and second variable pulleys connected through the metal belt by hydraulic pressure.

If a target shift-speed according to a driving condition such as a vehicle speed, an engine rotation speed, and a load is calculated, an opening of a shift-speed control valve connected to the first and second variable pulleys is controlled so as to achieve the target shift-speed.

A conventional continuously variable transmission includes a launching device such as a torque converter for stopping or starting a vehicle, one planetary gear set for forward/reverse speeds and two clutches, and further includes a control unit for controlling the clutches. Therefore, a layout may be complex, weight may increase, and mountability and fuel economy may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a continuously variable transmission for a vehicle having advantages of removing a launching device such as a torque converter by achieving continuously variable gear stage using a planetary gear set and a variable shift apparatus and improving performance and fuel economy by enlarging speed ratios.

According to various aspects of the present invention, a continuously variable transmission for a vehicle may include an input shaft receiving torque of an engine, a first power delivery shaft disposed in parallel with and apart from the input shaft, a variable shift apparatus configured to change rotation speed of the input shaft and transmit the changed rotation speed to the first power delivery shaft, a second power delivery shaft selectively receiving torque of the first power delivery shaft, a third power delivery shaft disposed apart from the second power delivery shaft, a planetary gear set including first, second, and third rotation elements, and an idle gear set operably connecting the input shaft with the first rotation element of the planetary gear set, in which the second rotation element may be directly connected to the third power delivery shaft and the third rotation element may be directly connected to the second power delivery shaft.

The continuously variable transmission may further include an output gear set transmitting torque from the third power delivery shaft to a differential apparatus.

The variable shift apparatus may include a primary pulley connected to the input shaft, a secondary pulley connected to the first power delivery shaft, and a belt operably connecting the primary pulley with the secondary pulley.

The first power delivery shaft and the second power delivery shaft may be selectively connected by a clutch.

The planetary gear set may be a single pinion planetary gear set and may be configured to perform shift by torque transmitted from the idle gear set and torque selectively transmitted from the variable shift apparatus.

The first rotation element may be a planet carrier, the second rotation element may be a sun gear, and the third rotation element may be a ring gear.

The idle gear set may include a transfer drive gear fixedly disposed on the input shaft, a transfer driven gear integrally formed with a planet carrier of the planetary gear set, and an idle shaft including an idle gear engaged with the transfer drive gear and the transfer driven gear.

The output gear set may include a first output gear fixedly disposed on the third power delivery shaft, an output shaft disposed in parallel with the third power delivery shaft, a second output gear fixedly disposed at an end portion of the output shaft and engaged with the first output gear, and a third output gear fixedly disposed at another end portion of the output shaft and operably connected to the differential apparatus.

According to various aspects of the present invention, a continuously variable transmission for a vehicle may include an input shaft receiving torque of an engine, a first power delivery shaft disposed in parallel with and apart from the input shaft, a variable shift apparatus configured to change rotation speed of the input shaft and transmit the changed rotation speed to the first power delivery shaft, a second power delivery shaft selectively connected to the first power delivery shaft through a clutch, a third power delivery shaft disposed apart from the second power delivery shaft, a planetary gear set configured to change rotation speed from the input shaft by using rotation speed selectively transmitted from the variable shift apparatus through the second power delivery shaft and transmit the changed rotation speed to the third power delivery shaft, and an idle gear set operably connected to the input shaft and any one rotation element of the planetary gear set.

The continuously variable transmission may further include an output gear set transmitting torque from the third power delivery shaft to a differential apparatus.

The variable shift apparatus may include a primary pulley connected to the input shaft, a secondary pulley connected to the first power delivery shaft, and a belt operably connecting the primary pulley to the secondary pulley.

The planetary gear set may be a single pinion planetary gear set and may include a ring gear directly connected to the second power delivery shaft, a planet carrier operably connected to the input shaft through the idle gear set, and a sun gear directly connected to the third power delivery shaft.

The idle gear set may include a transfer drive gear fixedly disposed on the input shaft, a transfer driven gear integrally formed with a planet carrier of the planetary gear set, and an idle shaft including an idle gear engaged with the transfer drive gear and the transfer driven gear.

The output gear set may include a first output gear fixedly disposed on the third power delivery shaft, an output shaft disposed in parallel with the third power delivery shaft, a second output gear fixedly disposed at an end portion of the output shaft and engaged with the first output gear, and a third output gear fixedly disposed at another end portion of the output shaft and operably connected to the differential apparatus.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
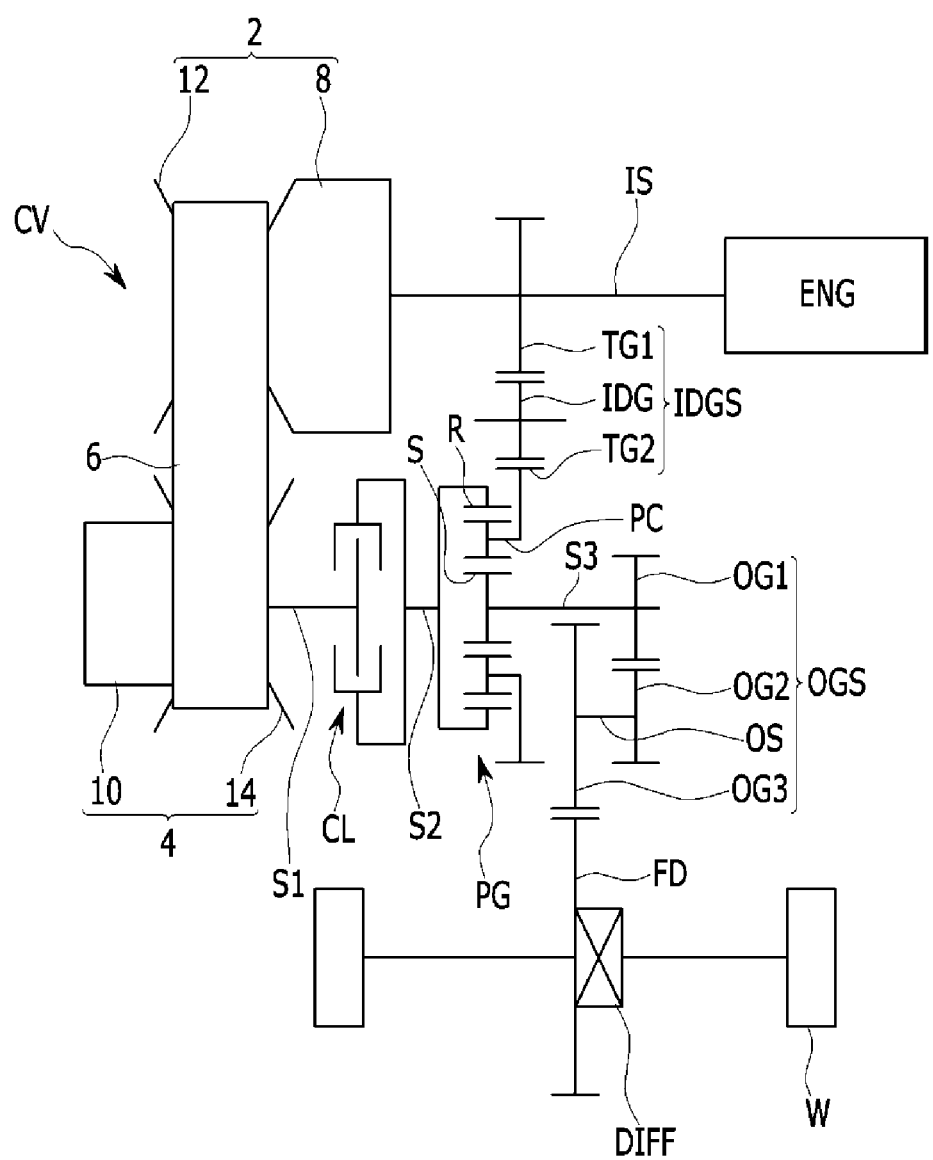
FIG. 1 is a schematic diagram of an exemplary continuously variable transmission according to the present invention.

FIG. 1 is a schematic diagram of a continuously variable transmission according to various embodiments of the present invention.

Referring to FIG. 1, a continuously variable transmission according to various embodiments of the present invention includes an input shaft IS, first, second, and third power delivery shafts S1, S2, and S3, a variable shift apparatus CV, a clutch CL, a planetary gear set PG, an idle gear set IDGS, and an output gear set OGS.

The input shaft IS is an input member and receives torque of an engine ENG. A torque converter may be disposed between the engine ENG and the input shaft IS.

The first power delivery shaft S1 is an intermediate power delivery member and is disposed in parallel with and apart from the input shaft IS. The first power delivery shaft S1 receives torque of the input shaft IS through the variable shift apparatus CV.

The variable shift apparatus CV includes a primary pulley 2 connected to the input shaft IS, a secondary pulley 4 connected to the first power delivery shaft S1, and a belt 6 connecting the primary pulley 2 with the secondary pulley 4.

The primary pulley 2 and the secondary pulley 4, as well known to a person of an ordinary skill in the art, respectively includes fixed sheaves 12 and 14 and movable sheaves 8 and 10. If the movable sheaves 8 and 10 move axially by hydraulic pressure, diameters of the pulleys 2 and 4 contacting side surfaces of the belt 6 change. Finally, a speed ratio is determined by a ratio between the diameters of the first pulley 2 and the second pulley 4.

The second power delivery shaft S2 is an intermediate power delivery member, is disposed concentrically with the first power delivery shaft S1, and is selectively connected to the first power delivery shaft S1 through the clutch CL.

The clutch CL may be a conventional multi-plate friction element of wet type that is operated by hydraulic pressure.

The third power delivery shaft S3 is disposed concentrically with the second power delivery shaft S3, and the planetary gear set PG is disposed between the second power delivery shaft S2 and the third power delivery shaft S3.

The planetary gear set PG is a single pinion planetary gear set and includes a sun gear S, a planet carrier PC rotatably supporting a pinion engaged with the sun gear S, and a ring gear R engaged with the pinion.

The sun gear S is directly connected to the third power delivery shaft S3, the ring gear R is directly connected to the second power delivery shaft S2, and the idle gear set IDGS is disposed between the planet carrier PC and the input shaft IS.

The idle gear set IDGS includes a transfer drive gear TG1 fixedly disposed on the input shaft IS, a transfer driven gear TG2 integrally formed with the planet carrier PC, and an idle shaft IDS including an idle gear IDG engaged with the transfer drive gear TG1 and the transfer driven gear TG2.

Therefore, the torque of the input shaft IS is continuously input to the planet carrier PC of the planetary gear set PG. In addition, rotating direction of the input shaft IS and rotating direction of the planet carrier PC are the same.

The output gear set OGS is an output member and transmits torque of the third power delivery shaft S3 to a driving wheel W through a differential apparatus DIFF.

That is, the output gear set OGS includes a first output gear OG1 fixedly disposed on the third power delivery shaft S3, an output shaft OS disposed in parallel with the third power delivery shaft S3, a second output gear OG2 fixedly disposed on an end portion of the output shaft OS and engaged with the first output gear OG1, and a third output gear OG3 fixedly disposed on the other end portion of the output shaft OS and engaged with a final reduction gear FD of the differential apparatus DIFF.

The differential apparatus DIFF includes the final reduction gear FD engaged with the third output gear OG3, and transmits torque input through the final reduction gear FD to the driving wheel W.

Instead of disposing the second output gear OG2 on the output shaft OS, the third output gear OG3 may be directly engaged with the first output gear OG1 and the final reduction gear FD.

Figure 2:
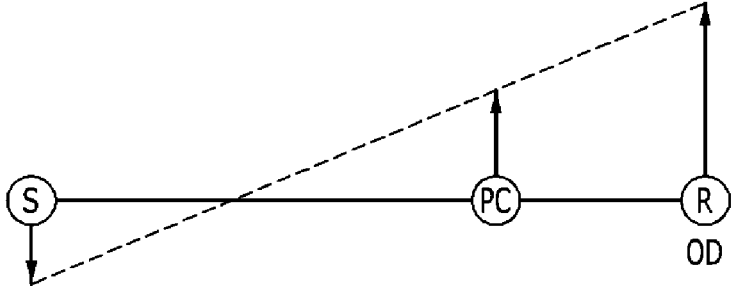
FIG. 2 is a lever diagram of the exemplary continuously variable transmission at each range according to the present invention.
Figure 2:
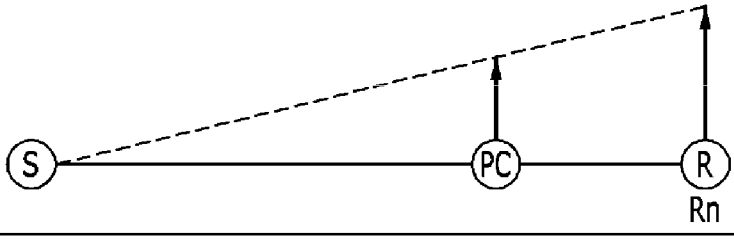
Figure 2:
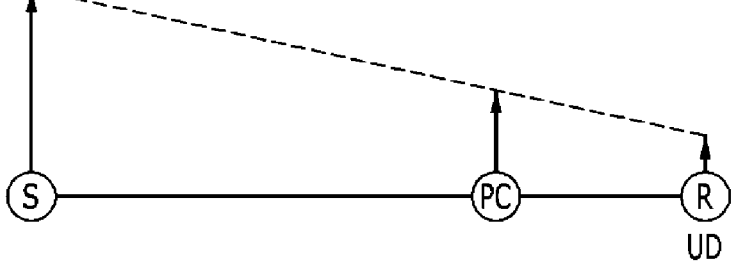

FIG. 2 is a lever diagram of a continuously variable transmission at each range according to various embodiments of the present invention.

Referring to FIG. 2, a clutch CL is operated at reverse (REV) range.

That is, in a state that the rotation speed of the input shaft IS is input to the planet carrier PC of the planetary gear set PG through the idle gear set IDGS, the rotation speed of the input shaft IS is increased by the variable shift apparatus CV and the increased rotation speed is input to the ring gear R. In this case, the sun gear S rotates inversely due to difference between rotation speed of the ring gear R and rotation speed of the planet carrier PC, and the reverse REV range is achieved.

The clutch CL is released at a neutral N state. At this time, the rotation speed of the input shaft IS is input to the planet carrier PC of the planetary gear set PG through the idle gear set IDGS, but the ring gear R runs idle. Therefore, torque is not output through the sun gear S and the neutral N state is maintained.

The clutch CL is operated at drive D range.

In a state that the rotation speed of the input shaft IS is input to the planet carrier PC of the planetary gear set PG through the idle gear set IDGS, the rotation speed of the input shaft IS is decelerated by the variable shift apparatus CV and the decelerated rotation speed is input to the ring gear R. In this case, the sun gear S rotates normally by difference between the rotation speed of the ring gear R and the rotation speed of the planet carrier PC, and the drive D range is achieved.

The continuously variable transmission according to various embodiments of the present invention can achieve the drive range and the reverse range by controlling rotation speed through the variable shift apparatus CV.

Since speed ratio is determined according to the rotation speed of the ring gear R, a transmission control unit controls the variable shift apparatus CV according to a running state.

The continuously variable transmission according to various embodiments of the present invention includes a planetary gear set, the variable shift apparatus and a clutch. Therefore, elements (valve body) of controlling hydraulic pressure may be simplified, capacity of a hydraulic pump may be reduced, and fuel economy and cost may be improved.

Since the one clutch is used as a launching clutch, a torque converter may be removed. Therefore, cost, length, and weight may be reduced.

In addition, if the torque converter is not used, hydraulic loss may be reduced and the elements of controlling hydraulic pressure may be simplified, and the capacity of the hydraulic pump may be reduced. Therefore, fuel economy may be greatly enhanced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A continuously variable transmission for a vehicle comprising:
    an input shaft receiving torque of an engine;
    a first power delivery shaft disposed in parallel with and apart from the input shaft;
    a variable shift apparatus configured to change rotation speed of the input shaft and transmit the changed rotation speed to the first power delivery shaft;
    a second power delivery shaft selectively receiving torque of the first power delivery shaft;
    a third power delivery shaft disposed apart from the second power delivery shaft;
    a planetary gear set including a first rotation element, a second rotation element, and a third rotation element; and
    an idle gear set operably connecting the input shaft with the first rotation element of the planetary gear set,
    wherein the second rotation element of the planetary gear set is directly connected to the third power delivery shaft and the third rotation element of the planetary gear set is directly connected to the second power delivery shaft,
    wherein the third power delivery shaft is coaxially disposed with the second power delivery shaft in series along an imaginary axis,
    wherein the planetary gear set is a single pinion planetary gear set and is configured to perform shift by torque transmitted from the idle gear set and torque selectively transmitted from the variable shift apparatus, and
    wherein the first rotation element of the planetary gear set is a planet carrier, the second rotation element of the planetary gear set is a sun gear, and the third rotation element of the planetary gear set is a ring gear.

2. The continuously variable transmission of claim 1, further comprising an output gear set transmitting torque from the third power delivery shaft to a differential apparatus.

3. The continuously variable transmission of claim 2, wherein the output gear set comprises:
    a first output gear fixedly disposed on the third power delivery shaft;
    an output shaft disposed in parallel with the third power delivery shaft;
    a second output gear fixedly disposed at a first end portion of the output shaft and engaged with the first output gear; and
    a third output gear fixedly disposed at a second end portion of the output shaft and operably connected to the differential apparatus.

4. The continuously variable transmission of claim 1, wherein the variable shift apparatus comprises:
    a primary pulley connected to the input shaft;
    a secondary pulley connected to the first power delivery shaft; and
    a belt operably connecting the primary pulley to the secondary pulley.

5. The continuously variable transmission of claim 1, wherein the first power delivery shaft and the second power delivery shaft are selectively connected by a clutch.

6. The continuously variable transmission of claim 1, wherein the idle gear set comprises:
- a transfer drive gear fixedly disposed on the input shaft;
- a transfer driven gear integrally formed with a planet carrier of the planetary gear set; and
- an idle shaft including an idle gear engaged with the transfer drive gear and the transfer driven gear.

7. A continuously variable transmission for a vehicle comprising:
- an input shaft receiving torque of an engine;
- a first power delivery shaft disposed in parallel with and apart from the input shaft;
- a variable shift apparatus configured to change rotation speed of the input shaft and transmit the changed rotation speed to the first power delivery shaft;
- a second power delivery shaft selectively connected to the first power delivery shaft through a clutch;
- a third power delivery shaft disposed apart from the second power delivery shaft;
- a planetary gear set configured to change rotation speed from the input shaft by using rotation speed selectively transmitted from the variable shift apparatus through the second power delivery shaft and transmit the changed rotation speed to the third power delivery shaft; and
- an idle gear set operably connected to the input shaft and any one rotation element of the planetary gear set,
- wherein the third power delivery shaft is coaxially disposed with the second power delivery shaft in series along an imaginary axis, and
- wherein the planetary gear set is a single pinion planetary gear set and includes a ring gear directly connected to the second power delivery shaft, a planet carrier operably connected to the input shaft through the idle gear set, and a sun gear directly connected to the third power delivery shaft.

8. The continuously variable transmission of claim 7, further comprising an output gear set transmitting torque from the third power delivery shaft to a differential apparatus.

9. The continuously variable transmission of claim 8, wherein the output gear set comprises:
- a first output gear fixedly disposed on the third power delivery shaft;
- an output shaft disposed in parallel with the third power delivery shaft;
- a second output gear fixedly disposed at a first end portion of the output shaft and engaged with the first output gear; and
- a third output gear fixedly disposed at a second end portion of the output shaft and operably connected to the differential apparatus.

10. The continuously variable transmission of claim 7, wherein the variable shift apparatus comprises:
- a primary pulley connected to the input shaft;
- a secondary pulley connected to the first power delivery shaft; and
- a belt operably connecting the primary pulley to the secondary pulley.

11. The continuously variable transmission of claim 7, wherein the idle gear set comprises:
- a transfer drive gear fixedly disposed on the input shaft;
- a transfer driven gear integrally formed with a planet carrier of the planetary gear set; and
- an idle shaft including an idle gear engaged with the transfer drive gear and the transfer driven gear.

* * * * *